(12) United States Patent
Archibald

(10) Patent No.: US 9,675,039 B1
(45) Date of Patent: Jun. 13, 2017

(54) SOLAR CURTAIN

(71) Applicant: John Paul Archibald, Annandale, VA (US)

(72) Inventor: John Paul Archibald, Annandale, VA (US)

( * ) Notice: Subject to any disclaimer, the term of this patent is extended or adjusted under 35 U.S.C. 154(b) by 0 days.

(21) Appl. No.: 15/149,107

(22) Filed: May 7, 2016

Related U.S. Application Data

(60) Provisional application No. 62/158,700, filed on May 8, 2015.

(51) Int. Cl.
*F24J 2/05* (2006.01)
*A01K 1/00* (2006.01)
*A01K 31/22* (2006.01)
*E06B 9/68* (2006.01)

(52) U.S. Cl.
CPC ........... *A01K 1/007* (2013.01); *A01K 1/0052* (2013.01); *A01K 1/0064* (2013.01); *A01K 1/0076* (2013.01); *A01K 31/22* (2013.01); *E06B 9/68* (2013.01)

(58) Field of Classification Search
CPC ......... Y02B 10/22; Y02E 10/44; Y02E 10/47; H02S 20/23; A01G 9/243; F24J 2/045; F24J 2/0444; F24J 2/05; F24D 2200/14
USPC ........................................ 126/625, 674, 628
See application file for complete search history.

(56) References Cited

U.S. PATENT DOCUMENTS

| | | | | |
|---|---|---|---|---|
| 2,626,591 A | * | 1/1953 | Mazur | A01K 1/00 119/449 |
| 2,990,837 A | * | 7/1961 | Cushman | E04H 15/20 4/506 |
| 3,102,532 A | * | 9/1963 | Shoemaker | F24J 2/28 126/649 |
| 3,875,925 A | * | 4/1975 | Johnston | F24J 2/0444 126/629 |
| 4,151,830 A | * | 5/1979 | Crombie | F24J 2/205 126/591 |
| 4,182,307 A | * | 1/1980 | Brindle | F24J 2/204 126/625 |
| 4,203,425 A | * | 5/1980 | Clark | F24J 2/1052 126/570 |
| 4,342,307 A | * | 8/1982 | Tuck | F24J 2/0488 126/674 |
| 4,404,958 A | * | 9/1983 | Boettcher | F24J 2/20 126/625 |
| 7,748,169 B2 | * | 7/2010 | Cote | E06B 9/02 454/334 |
| 8,191,547 B2 | * | 6/2012 | Pellegrino | F24J 2/0433 126/624 |

(Continued)

*Primary Examiner* — Rodney Mintz
*Assistant Examiner* — Daniel Kenny
(74) *Attorney, Agent, or Firm* — Caseiro Burke LLC; Chris A. Caseiro

(57) ABSTRACT

A solar air heating curtain for installation on the wall or eave of a building consisting of a sheet of flexible translucent or transparent film facing outward from the building and a sheet of flexible film facing inward toward the building with both films joined around the perimeter forming an interior air volume, with a flexible air permeable material, that is heated when exposed to solar energy, suspended between the films, and a fan to move air from outside; through an air inlet, through the interior air volume in close contact with the air permeable material, and through an air outlet.

3 Claims, 4 Drawing Sheets

(56) References Cited

U.S. PATENT DOCUMENTS

2011/0297299 A1* 12/2011 Lippy .................... B29D 22/02
 156/145
2014/0179185 A1* 6/2014 Malinowski .............. B32B 5/02
 442/1

* cited by examiner

Figure 4
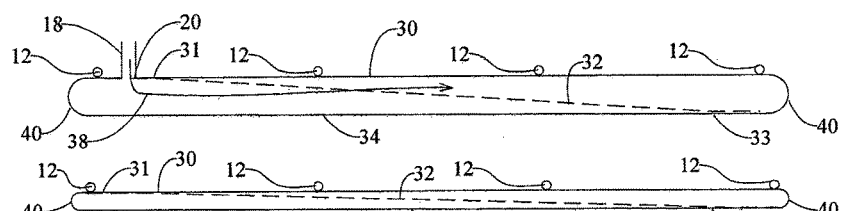
Figure 5
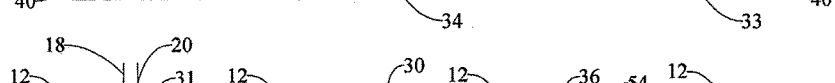
Figure 6
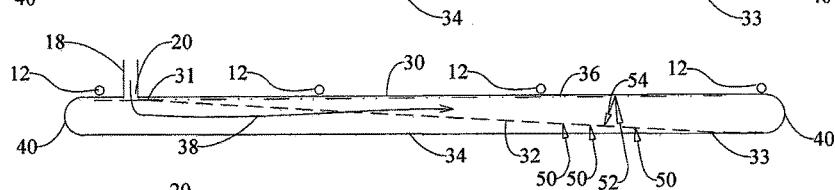
Figure 7

SOLAR CURTAIN

BACKGROUND

Commercial poultry growers raise thousands of birds in large poultry houses. Chickens raised for meat consumption are grown from small chicks to market weight in about 6 weeks when conditions in the poultry house are optimal. This includes adequate feed, water, temperature, and fresh air ventilation.

The poultry houses are relatively inexpensive to construct and operate. A typical house is several hundred feet long and 40 to 60 feet wide. When a flock of chicks is first placed in the house, the internal temperature needs to be about 90 F and there is minimal need for ventilation with outside air. As the birds grow, the internal house temperature is lowered regularly, reaching about 70 F by the 4th week. The need for ventilation air increases as the birds grow. Older houses used moveable curtains on the side of the houses to let in light and admit warm or cool fresh air during favorable weather conditions. The curtains could be closed to keep out undesirable weather and daylight or keep heat in the house.

Most modern houses have continuous metal side walls and rely on large fans and louvers for ventilation to remove humidity, carbon dioxide, and ammonia and move fresh outdoor air through the house. The inlet louvers of these modern houses are typically installed along the side walls near the eaves, and spaced roughly 30 to 50 feet along the length of the house. As the fans exhaust air from the house, fresh, outside air is pulled in through the inlet louvers.

During the fall, winter, and spring, the requirements to bring in fresh air into the house, result in cold air being drawn into the house. To maintain ideal temperature in the house to maximize bird growth, the growers will run heaters. The fuels used most frequently in poultry house heaters are propane and fuel oil, which are delivered by tanker truck to the houses. These are generally the most expensive heating fuels per unit of energy delivered. Less expensive fuels, such as natural gas, are not widely available to growers in rural locations.

In many parts of the United States, the cost of heating the poultry house is as much as one third of grower's variable costs of operating the house. Occasionally, due to conditions in the fuel markets or extreme weather, the reduced availability of fuel will cause the price of fuel to rise rapidly during the heating season. During those times, the growers may lose money on operating the poultry houses and in extreme cases, may not have adequate supplies to maintain the required temperatures in the houses to protect the birds.

An alternative to heating with propane and fuel oil is solar heating using solar thermal collectors. The solar heat that is available can be useful to displace some or all of the heat provided by the fuel burning heaters. Every unit of solar heat provided to the house displaces a unit of fuel based heat delivered from combustion of propane, fuel oil, or other fuel sources.

Typically solar collectors have been assembled from rectangular panels of about 30 to 40 square feet each, often called 'black box' collectors. The most common black box panels are used to heat water, but others heat air. The system is expensive to install due to the large number of manufactured panels and the numerous interconnections required between panels. Another solar approach is to install large, dark colored metal sheets on the wall and collect the solar heated air with fans and ducts from behind the metal sheets. This approach has been used on several large industrial buildings and is less expensive to install than the black box panels.

One disadvantage of the fixed metal sheet and smaller black box solar collectors is that they may be exposed to sunlight and generate heat during days with moderate temperatures, when no heating is required. Even when solar fans are not running, the collector surfaces are being heated and releasing heat by radiation, conduction, and by convection of warm air currents near the house, which adds heat to the house when it is not desired. Another disadvantage is that the fixed sheet metal collectors are generally more expensive then collectors made of thin flexible materials that can solar heat air with comparable efficiency. These flexible materials, produced in large rolls as polymer films, fabrics, and thin metal foils, can be combined to make efficient solar collectors at very low cost.

The current invention uses an alternate approach combining flexible materials to efficiently collect solar energy to heat air for use within poultry houses. The flexible materials are deployed in the form of a curtain attached to the side of the poultry house. The solar curtain takes advantage of technology familiar to many poultry growers and greenhouse growers to deploy a system that can be raised or lowered to take advantage of the solar and weather conditions to meet the heating needs of the poultry house.

The present invention combines 4 technologies common to the agriculture industry into a single innovative system to capture solar heat for poultry houses. Greenhouse film, allows sunlight to pass through the film while resisting UV degradation and resisting the passage of warm or cold air from outside the film. Agricultural shade cloth absorbs a portion of the solar energy that falls on the exposed face of the cloth, heating the cloth and the air that passes in close contact to it. Radiant barrier film reflects visible light and infrared energy and emits minimal energy from the shaded side. Greenhouse/poultry house moveable curtain technologies allow heating and insulating curtains to be raised or lowered to optimize the internal conditions based on outside conditions and provide heating and cooling energy savings.

The innovative combination of the 4 technologies in a single system can capture a significant amount of solar energy, in the form of solar heated air to heat poultry houses and can also keep the houses warmer by insulating the exterior wall from cold outside weather conditions. When rolled down along the side of the poultry house, the solar curtain creates a space between the side of the house and the side of the curtain facing the wall, helping to protect the house from cold winds and outdoor air temperatures, reducing the heat loss from the sides of the house caused by forced convection from the winds and conduction from the temperature differences between the outdoor air and wall along the warmer house sides. When the solar curtain incorporates a radiant barrier film, there is additional heat loss benefit in that during certain conditions, such as on cold nights, the radiant barrier will reflect heat from the warm house sides back toward the house side, thus preventing some radiant heat loss.

Another advantage of the preferred embodiment is that the solar curtain can be rolled up to reduce its exposure to the sun. This would typically occur during late spring, summer and fall, when no additional heating is needed in the poultry house. By rolling the curtain up to minimize its exposure, cooling breezes and nighttime radiation from the house sides to the surroundings, will help to cool the house. Rolling the curtain up, when not needed, will also reduce its exposure to solar energy, which would otherwise slowly degrade the fabrics and films of which it is composed. By rolling the curtain up, the life of the fabrics and films will be prolonged, extending its economic life before new films and fabrics would be installed.

Another preferred embodiment uses a shade cloth absorber fabric arranged in a corrugated fashion within the curtain. The corrugation of the shade cloth permits that air flowing through the shade cloth to come in contact with more than one portion of the solar heated shade cloth. Because the shade cloth has openings in its construction it allows air to pass through but it also allows a portion of the solar energy that falls on the curtain to pass through the cloth without impacting and heating the fabric. In commercial practice, shade cloth is often rated by the amount of sunlight that it will block from passing through the cloth from the front and out the back. A shade cloth rated at 60% will block 60% of the sunlight hitting the front from passing out the back of the cloth. Therefore the cloth will only absorb up to 60% of the solar energy falling on the front of the cloth. As a result, as air passes through the solar heated 60% shade cloth, there is only a maximum of 60% of the solar energy available at the solar heated cloth to heat the air as compared to a 90% shade cloth, which would absorb up to 90% of the solar energy falling on it. The lower heat energy transfer to the air of the 60% shade cloth compared to the 90% shade cloth, results in a lower heated air temperature leaving the 60% shade cloth for a given flow of air.

By passing air through a corrugated shade cloth with contact with more that one portion of the solar heated shade cloth, the air temperature exiting the second portion of the shade cloth will be higher than air passing through a single portion of shade cloth. Repeated passage through multiple portions of the corrugated shade cloth will continue to raise the air temperature, up to a practical limit for the leaving air temperature that is closer to a temperature approaching the shade cloth with no air flow, referred to as the stagnation temperature.

However, an advantage of using a shade cloth with lower shading rating, such as 60% shading, is that it allows air to flow more freely, with less pressure drop, than it would flow with a higher shading rating, such as 90% shading. Typically the 90% shade cloth is made with a tighter weave or thicker threads that result in less open space for sunlight or air to pass through the cloth. When air is forced through the tighter spaces in the higher rated shade cloth, such as when a fan pushes air through the cloth, it takes more fan energy to push air through the tighter spaces in the higher rated cloth than for air pushed through the lower rated cloth with more open space between threads. By balancing expensive electric energy required for the fan with the amount of heat energy gained by heat transfer from the shade cloth with varied ratings, will give the most economical solution for gathering solar heat from the curtain.

In another preferred embodiment, a radiant barrier film is installed within the curtain behind a lower rated shade cloth. The sunlight that passes through the shade cloth will be reflected back to the backside of the shade cloth by the radiant barrier film. For a 60% rated shade cloth, 40% of the solar energy would pass through the cloth and hit the radiant barrier. If 99% of that solar energy were reflected by the radiant barrier back to the shade cloth, which would absorb up to 60% of the reflected solar energy, another 23.7% (0.99×0.40×0.60) of the total solar energy hitting the curtain would be absorbed from the reflected energy hitting the backside of the shade cloth. So, the total solar energy absorbed would be up to 83.7% of the solar energy approaching the front of the curtain, instead of a maximum of 60% absorbed by a shade cloth with solar energy approaching only the front side.

There are several advantages to using the radiant barrier within the curtain. First, the radiant barrier results in higher solar energy absorbed by the shade cloth, compared to the use of a shade cloth of the same rating, without radiant barrier. Second, the use of the radiant barrier permits the use of lower rated shade cloths, with their advantage of lower pressure drop and fan energy use, without a loss of solar energy collection capability compared to higher rated shade cloths with higher air pressure drop and fan energy use. Third, the use of lower rated shade cloth also results in lower cost of the shade cloth compared to higher rated shade cloth with the same solar collections capability, as shade cloth typically increases with price as rating increases. Fourth, the use of the radiant barrier reduces the radiant heat loss from the warm walls of the warmer poultry house during cold days and nights when no solar heating is taking place, as the radiant energy from the warmer walls is reflected back by the radiant barrier toward the walls instead of passing through to the colder inner facing film, the shade cloth, and outer facing film of the curtain.

DESCRIPTION OF THE DRAWINGS

FIG. 4 is a section view of the system at section line B-B at mid-height of the curtain.

FIG. 5 is a section view of the system at section line A-A near the bottom of the curtain.

FIG. 6 shows a section view of the system at mid-height of the curtain showing a radiant barrier film between the solar absorber fabric and the polymer film facing the wall.

FIG. 7 shows a section view of the system at mid-height of the curtain showing the solar absorber fabric installed in a corrugated pattern.

DETAILED DESCRIPTION OF A PREFERRED EMBODIMENT

Figure 1:
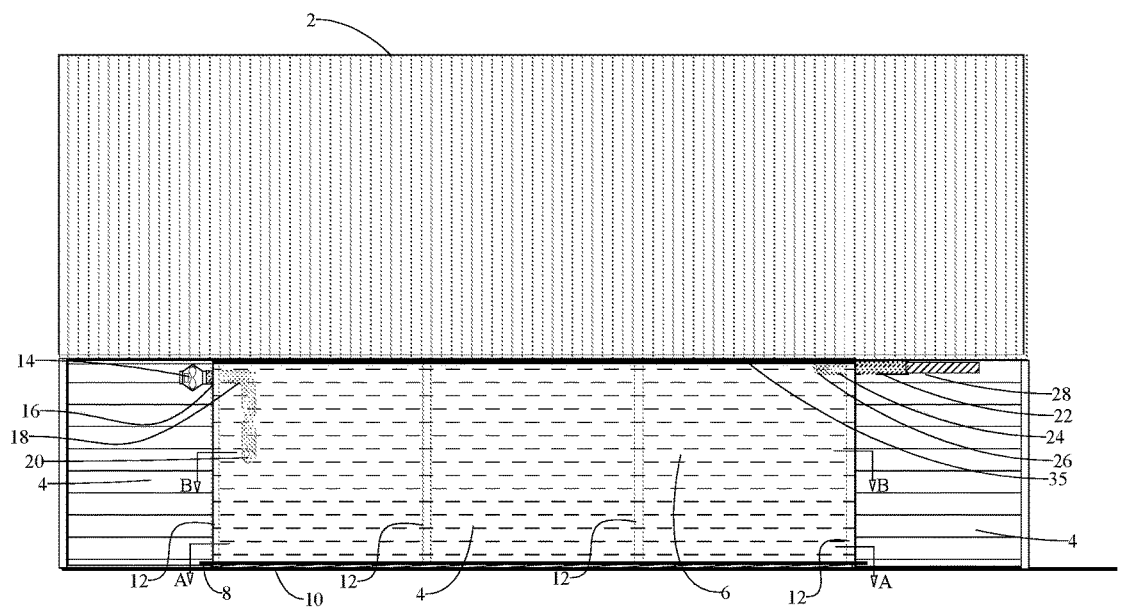
FIG. 1 is an elevation view of the system rolled down at the side of a poultry house.

In the preferred embodiment shown in FIG. 1, The solar curtain 6, is installed on the side of a poultry house which is constructed with roof 2, and walls 4. The curtain is held at the bottom by a round pipe 8, on which the curtain is wrapped and fastened. The round pipe 8, is attached to the restraining board 10, which is attached to the house wall at the bottom of the curtain. The curtain is fastened at the top by a strip 35, which clamps the curtain over its length. Strip 35 is attached to the roof 2. Behind the curtain are pipe supports 12, spaced along the length of the curtain, which are visible through the slightly transparent curtain when the curtain is assembled from transparent plastic films on the inner and outer sides and a low rated shade cloth, which allows some light to pass through. Also behind the curtain are sections of duct 18 and 24, which connect to an air inlet in the curtain 20, and an air outlet from the curtain 26. The ducts connect to sections of duct beyond the curtain sides 16 and 22. Duct section 16, connects to an electric fan 14, which supplies outside air to the interior of the curtain. Duct section 22, carries solar heated air from the curtain to an existing air inlet 28, in the side of the poultry house wall.

Figure 2:
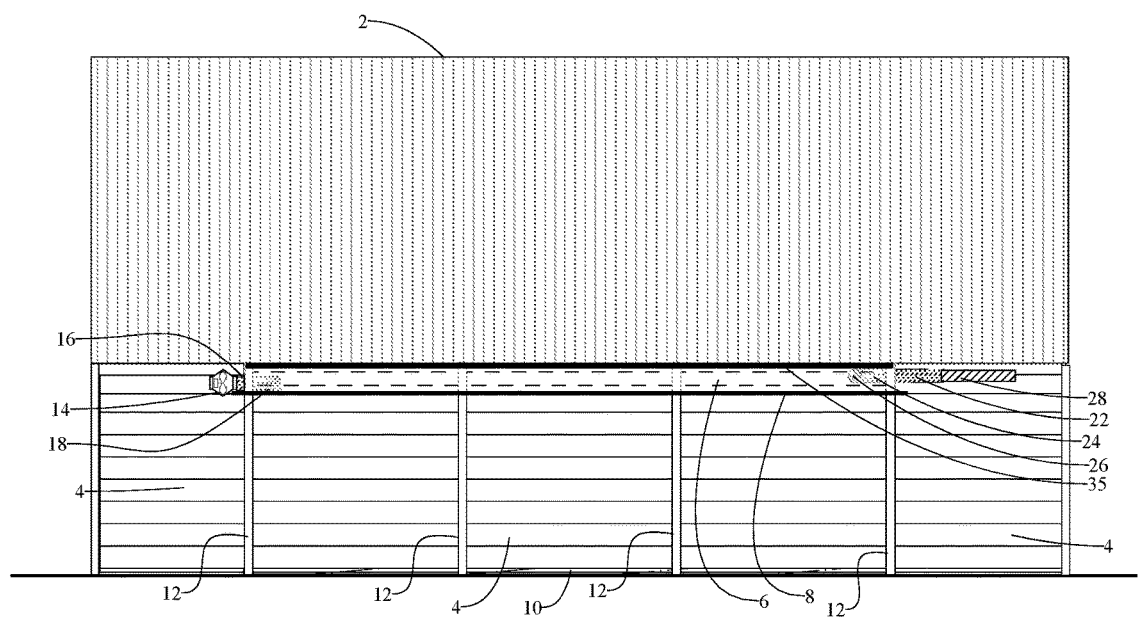
FIG. 2 is an elevation view showing the solar curtain system rolled up at the side of a poultry house.

FIG. 2 shows the solar curtain 6, raised to a position that reduces the area of the curtain exposed to solar energy and exposes the existing walls 4, of the poultry house and most of the support pipes 12, to unobstructed view. A preferred method of raising the curtain is by rolling the curtain on the round pipe 8, using any of several manual or motorized means commonly available in commercial greenhouse or poultry house curtain systems. By use of flexible duct 18, the duct and flexible air inlet to the curtain 20, not shown in the rolled up position, can be rolled within the curtain without damage, and unrolled and ready for use when the curtain is rolled down.

Figure 3:
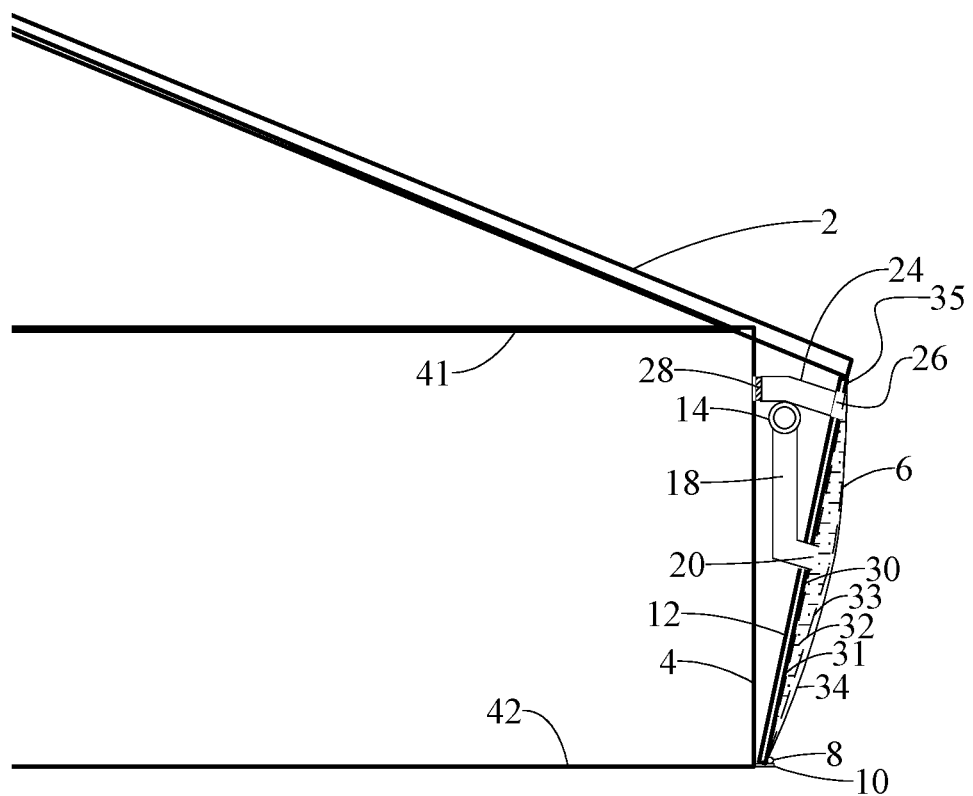
FIG. 3 is a section view from the side of the system on the side of a poultry house.

FIG. 3 shows a cutaway side view of the solar curtain showing the individual components of the curtain on the side of the poultry house. The poultry house is constructed with roof 2, walls 4, floor 42, and ceiling 41. A typical poultry house will have several air inlets 28, spaced along the walls. The solar curtain 6, fan 14, and ductwork 18 and 24, are shown connected to the curtain. Support pipes 12, round pipe 8, at the bottom of the curtain, restraining board 10, and strip 35, at the top of the curtain make up the remainder of the components of the preferred embodiment.

The curtain 6, shown in FIG. 3 is constructed of a transparent or translucent outer sheet of plastic film 34, and an inner sheet of plastic film 30, closer to the wall 4. The sheets 34 and 30, could be formed from a single sheet folded at any of the top, bottom, and sides to form outward facing sheet 34, and inner facing sheet 30. In a preferred embodiment, the sheets would be made of a plastic film used for covering greenhouses and designed to withstand several years of exposure to direct sunlight. Inside the space between sheets 30 and 34, a flexible solar absorbing sheet 32, such as shade cloth, is installed between the strip 35, at the top and the round pipe 8, at the bottom. The solar absorbing sheet 32, is preferentially arranged with one end, closest to the air inlet 20, arranged against the inner facing sheet 30. The other end of the solar absorbing sheet closest to the air outlet 26, is arranged against the outer sheet of plastic 34.

FIG. 4 is a section cut view of section B-B shown in FIG. 1. The section cut shows the support pipes 12, and the air inlet 18, in contact with the inner facing plastic sheet, 30. The inner facing plastic sheet 30, and the outer facing plastic sheet 34, are attached at the ends 40, to form a closed curtain. In the preferred embodiment, the closed ends can be formed by any of several means, such as plastic welding, stitching, gluing, or by folding a single larger sheet which incorporates both the inner facing sheet 30, and the outer facing sheet 34, over one end 40, and attaching the opposite end by other means. The shade cloth 32, is installed, between the inner and outer facing sheets, 30 and 34. In the preferred embodiment, the shade cloth is attached to the outer facing sheet 34, at point 33, and at the inner facing sheet 30, at point 31. When the fan 14, not shown, is turned on, air 38, is forced to move through the curtain. The preferred attachment of the shade cloth 32, to the inner and outer plastic sheets, 30 and 34, forces the air 38, flowing through the curtain, to move from the air inlet 20, through the shade cloth 32, and toward the opposite end of the curtain, where it exits at the air outlet 26, not shown in this cut section view.

FIG. 5 is a section cut view of section A-A shown in FIG. 1. This section cut is closer to the round pipe at the bottom of the curtain and would be thinner from inner film 30, to outer film 34. The section cut shows the support pipes 12, in contact with the inner plastic sheet 30, the ends of the curtain 40, and the shade cloth 32, with attachment points 31, to the sheet 30, and 33, to sheet 34.

FIG. 6 shows a section cut of another preferred embodiment at a mid-height location similar to section B-B shown in FIG. 1. This preferred embodiment includes all the components shown in FIG. 1 but incorporates a flexible radiant barrier film, 36, within the curtain. The radiant barrier film 36, is installed between the inside of the inner facing film 30, and the shade cloth 32. The radiant barrier film is preferentially attached at the top and bottom of the curtain by wrapping it around the round pipe at the bottom, between the inner sheet 30, and the shade cloth 32, and attaching it to the strip at the top, between the inner facing sheet 30, and the shade cloth 32. Solar energy 50, striking the shade cloth 32, will heat the cloth from the outward facing side of the cloth. Solar energy 52, passing through the openings of the shade cloth will be reflected 54, by the radiant barrier 36, back to the inner facing side of the shade cloth where a portion of the reflected solar energy 54, will be absorbed by the shade cloth, raising its temperature above that of solar energy passing only from the outer film through the shade cloth and out of the inner film, when no radiant barrier is installed.

FIG. 7 shows another preferred embodiment at a mid-height location similar to section B-B shown in FIG. 1. This preferred embodiment includes all the components shown in FIG. 1 but incorporates a shade cloth 43, which is installed in a corrugated fashion within the curtain. The shade cloth 43, is attached at point 31, and at one or more locations 37, to the inner facing film 30, and at point 33, at one or more locations 35, spaced between points 31 and 37. The corrugated arrangement of the shade cloth 43, forces the moving air 38, within the curtain to move through the openings of multiple sections of shade cloth 43. As the air moves through each section of solar heated shade cloth, it is further heated by the heat transferred from the shade cloth. By balancing the air volume flow through the curtain, the number of corrugations in the shade cloth, the performance rating of the shade cloth at blocking solar passage, and the ambient solar and temperature conditions, the temperature of the solar heated air delivered from the curtain can be adjusted to meet a range of temperatures and fan energy use and expense. In the preferred embodiment shown in FIG. 7, the shade cloth is attached at point 31, and two points 37, to the inward facing film 30, and to point 33, and two points 35, to the outward facing film 34. The attachments could be made by any method such as plastic welding, stitching, gluing, or by other fastening means.

The preferred embodiments described above represents one set of arrangements and equipments and components to provide means of solar heating air for poultry houses with lower fuel energy use and expense than traditional poultry houses. It will be apparent to those skilled in the art that there are other combinations of equipments, components, and arrangements that can be applied to the preferred embodiments to provide the same innovative benefits of lower fuel energy use and expense. Such alternatives could include numerous separated layers of impermeable solar air absorbing plastic films or fabrics within the curtain instead of shade cloth, to provide solar absorption and air flow in close contact to the solar heated films and fabrics. The inner facing and outer facing sheets and the ends could be preformed from a single tube shape. Other arrangements of ducts and fans attached to the curtain would be easily configured by those skilled in the air handling trade. Various manners of ducting, air flow, and attachment to the exiting or new poultry house inlet louvers are also possible. Use in agricultural and industrial buildings beyond poultry houses is also envisioned, including; swine farrowing houses, crop drying houses, and industrial building with high air heating needs as just a few of the other applications to which the curtain system could be applied. All these alternative arrangements of components are obvious to persons skilled in the art or solar thermal energy, air flow, and building energy management and are envisioned within the scope of the invention.

What is claimed is:

1. A solar air heating curtain suspended from a building wall or eave, comprised of an outer sheet of flexible transparent or translucent plastic film, and an inner sheet of flexible plastic film that is transparent or translucent, joined together around the perimeter to form a closed air chamber with a top, a bottom, two opposed sides, an outer face and an inner face and forming an interior air volume between the outer and inner faces, with a flexible air permeable material, which becomes heated when exposed to sunlight, which is suspended in the interior air volume between the outer face and inner face and which spans substantially all of the area between the sides and top and bottom of the curtain, a flexible radiant barrier film positioned within the interior air volume between the flexible air permeable material and the inner sheet of flexible plastic film, and with an air inlet to the interior air volume located near one side and an air outlet from the interior air volume near the opposite side, with a fan to move air through the interior of the curtain from the air inlet to the air outlet such that the air passes once through the suspended air permeable material and becomes heated as it passes in close contact with the solar heated air permeable material, wherein the solar air heating curtain is rolled up from the bottom to a stored position higher on the wall or under the eave, when not in use for solar air heating, to expose the warm wall of a building to a colder outside environment to increase heat loss from the wall by conduction, free and forced convection, and radiation, and such solar air heating curtain is rolled down to provide a space between the warm wall of the building and the inner sheet of flexible plastic film of the curtain to reduce the entrance of cold outdoor air and cold wind into the space to reduce the heat loss from the wall from conduction and forced and free convection, and to reduce heat loss from the wall by radiation due to reflection of radiant energy from the wall by the radiant barrier.

2. A solar air heating curtain suspended from a building wall or eave, comprised of an outer sheet of flexible transparent or translucent plastic film, and an inner sheet of flexible plastic film that is transparent or translucent, joined together around the perimeter to form a closed air chamber with a top, a bottom, two opposed sides, an outer face and an inner face and forming an interior air volume between the outer and inner faces, with a flexible air permeable material, which becomes heated when exposed to sunlight, which is suspended in the interior air volume between the outer face and inner face and which spans substantially all of the area between the sides and top and bottom of the curtain, with a flexible radiant barrier film positioned in the interior air volume between the inner side of the flexible air permeable material and the inner sheet of flexible plastic film and that spans substantially all of the area between the sides, top and bottom of the curtain, such that any sunlight entering the interior air volume from the outer face toward the inner face and which passes through any openings in the air permeable material, is reflected back by the radiant barrier material toward the air permeable material, where it can be absorbed by the air permeable material, and with an air inlet to the interior air volume located near one side and an air outlet from the interior air volume near the opposite side, with a fan to move air through the interior of the curtain from the air inlet to the air outlet such that the air passes once through the suspended air permeable material and becomes heated as it passes in close contact with the solar heated air permeable material, wherein the solar air heating curtain is rolled up from the bottom to a stored position higher on the wall or under the eave, when not in use for solar air heating, to expose the warm wall of a building to a colder outside environment to increase heat loss from the wall by conduction, free and forced convection, and radiation, and such solar air heating curtain is rolled down to provide a space between the warm wall of the building and the inner sheet of flexible plastic film of the curtain to reduce the entrance of cold outdoor air and cold wind into the space to reduce the heat loss from the wall from conduction and forced and free convection, and to reduce heat loss from the wall by radiation due to reflection of radiant energy from the wall by the radiant barrier.

3. A solar air heating curtain suspended from a building wall or eave, comprised of an outer sheet of flexible transparent or translucent plastic film, and an inner sheet of flexible plastic film that is transparent or translucent, joined together around the perimeter to form a closed air chamber with a top, a bottom, two opposed sides, an outer face and an inner face and forming an interior air volume between the outer and inner faces, with a flexible air permeable material, which becomes heated when exposed to sunlight, suspended in corrugated fashion between the outer and inner faces of the interior air volume and which spans substantially all of the area between the sides and top and bottom of the curtain, a flexible radiant barrier film positioned within the interior volume between the flexible air permeable material and the inner sheet of flexible plastic film, and with an air inlet to the interior air volume located near one side and an air outlet from the interior air volume near the opposite side, with a fan to move air through the interior of the curtain from the air inlet to the air outlet such that air moving from the air inlet to the air outlet moves through the air permeable material more than once, such that the air absorbs additional heat from each additional close contact with the solar heated air permeable material, wherein the solar air heating curtain is rolled up from the bottom to a stored position higher on the wall or under the eave, when not in use for solar air heating, to expose the warm wall of a building to a colder outside environment to increase heat loss from the wall by conduction, free and forced convection, and radiation, and such solar air heating curtain is rolled down to provide a space between the warm wall of the building and the inner sheet of flexible plastic film of the curtain to reduce the entrance of cold outdoor air and cold wind into the space to reduce the heat loss from the wall from conduction and forced and free convection, and to reduce heat loss from the wall by radiation due to reflection of radiant energy from the wall by the radiant barrier.

* * * * *